United States Patent
Oppelt et al.

(10) Patent No.: US 7,064,628 B2
(45) Date of Patent: Jun. 20, 2006

(54) CROSSBAR SWITCH

(75) Inventors: Ralph Oppelt, Uttenreuth (DE); Markus Vester, Nürnberg (DE)

(73) Assignee: Siemens Aktiengesellschaft, Munich (DE)

(*) Notice: Subject to any disclaimer, the term of this patent is extended or adjusted under 35 U.S.C. 154(b) by 20 days.

(21) Appl. No.: 10/917,913

(22) Filed: Aug. 13, 2004

(65) Prior Publication Data
US 2005/0041496 A1    Feb. 24, 2005

(30) Foreign Application Priority Data
Aug. 14, 2003   (DE) .................. 103 37 416

(51) Int. Cl.
*H01P 1/10*     (2006.01)
*H01P 1/15*     (2006.01)

(52) U.S. Cl. ...................... 333/101; 333/103
(58) Field of Classification Search .......... 333/101, 333/103, 104; 340/202, 2.29
See application file for complete search history.

(56) References Cited

U.S. PATENT DOCUMENTS

| | | | |
|---|---|---|---|
| 4,346,381 A | 8/1982 | Bauch et al. | 340/2.29 |
| 4,630,046 A | 12/1986 | Rein | 340/2.2 |
| 4,983,895 A | 1/1991 | Koharagi et al. | 318/254 |
| 4,998,101 A * | 3/1991 | Trumpp et al. | 340/2.29 |
| 5,055,836 A | 10/1991 | Kane | 340/2.2 |
| 6,265,953 B1 | 7/2001 | Romano | 333/101 |
| 6,781,475 B1 * | 8/2004 | Veenstra et al. | 333/103 |

FOREIGN PATENT DOCUMENTS

| | | |
|---|---|---|
| DE | 40 10 283 A1 | 10/1991 |
| EP | 0 24 027 A1 | 2/1981 |
| EP | 0 148 395 A2 | 9/1985 |

* cited by examiner

*Primary Examiner*—Dean Takaoka
(74) *Attorney, Agent, or Firm*—Schiff Hardin LLP

(57) ABSTRACT

A crossbar switch comprises a number of crossing points at which controllable switch elements are arranged, via which an input signal supplied to a row can be interconnected to a column intersecting this row at this crossing point when an interconnection signal is supplied to the respective setting parameter via a control input. The controllable switch elements comprise amplifier elements whose amplifier inputs are connected with the rows and whose amplifier outputs are connected with the columns. The amplifier elements are wired such that they only consume electrical energy when the interconnection signal is supplied to the respective crossing point.

22 Claims, 4 Drawing Sheets

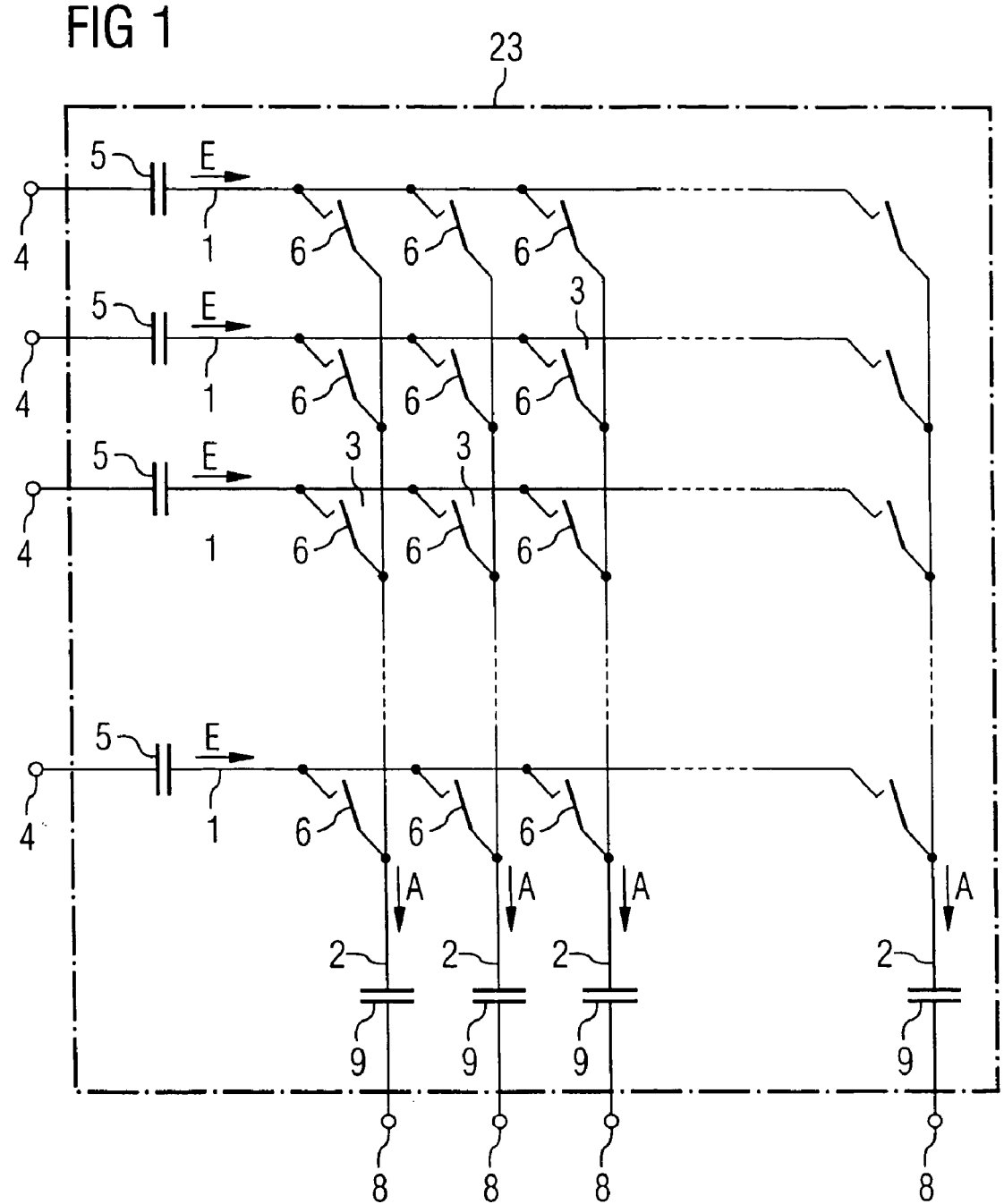

CROSSBAR SWITCH

BACKGROUND OF THE INVENTION

The present invention concerns a crossbar switch with a number of rows and a number of columns crossing the rows at crossing points, in which: a) an input signal is supplied to each row via a row input; b) controllable switch elements are arranged at the crossing points via which an input signal supplied to a row is connected through to the column crossing this row at this crossing point when a switching signal is supplied to the respective crossing point, and c) whereby a switched input signal is tapped as an output signal to each column via a column output.

It is the object of a crossbar switch to interconnect a number of input signals to a number of outputs according to arbitrary specifications. The number of input signals is normally different than the number of output signals. In order to achieve such a switching capability, switch elements are arranged at crossing points, whereby each switch element can be switched individually and thus independent of the other switch elements. Consequently, a number of control lines are necessary for correct activation of the crossbar switch; this number is equal to the product of the number of rows with the number of columns.

Crossbar switches of this type are, for example, distributed by the company Analog Devices as integrated crossbars with the type designations AD8108 through AD8111 as well as AD8114 and AD8115.

In these Analog Devices' crossbars, passively operated field effect transistors are used as switch elements. These crossbar switches therefore have only limited channel numbers of, for example, 8×16, 16×8 or 16×16 input and output signals. These components also exhibit very high rise of the transmission loss at high frequencies, such that it is not possible to interconnect these components as sub-matrices into a larger matrix.

Crossbar switches are also known in which pin diodes are used as high-frequency switches. Given very high frequencies (for example, above 100 MHz), the lock damping of a pin diode connected as a series switch is, however, no longer sufficient, such that a three-fold structure (series-short-series switch) must be chosen. In such a three-fold structure, the control current must be fed to the high-frequency connections of the switch elements. The necessary expenditure of HF chokes and blocking capacitors is therefore significant and connected with secondary effects. In practice, with such three-fold structures, no crossbar switches can therefore also be realized with numbers of high channels.

Switches are also conceivable in which a large number of switch elements possess a common star point. However, these concepts exhibit a serious disadvantage, since, at the star points, the sum of the capacitiances of all switch elements is switched in parallel. Together with the source or load impedance of the connected circuits, a limit frequency therefore results that is inversely proportional to this total capacitance.

The attempt to choose a lower source and load impedance leads in return to a larger absorption in the series resistance of an interconnected switch element. The attempt to counteract this effect with a larger chip area of the switch elements in turn leads to a higher capacitance. Given a predetermined frequency bandwidth and predetermined transmission losses, there is therefore a maximum number (dependent on the switch technology) of junctions that can still be realized. Very high node counts (for example, 64 nodes or more) at high limit frequencies of, for example, 100 MHz cannot be realized.

SUMMARY OF THE INVENTION

The object of the present invention is to achieve a crossbar switch in which the number of rows and the number of columns can be very large without negatively influencing the bandwidth and the dynamics of the crossbar switch.

This object is achieved in that:

the controllable switch elements comprise amplifier elements with an amplifier input and an amplifier output, the amplifier inputs are connected with the rows and the amplifier outputs are connected with the columns, and the amplifier elements are connected such that they only consume electrical energy when the interconnection signal is supplied to the respective crossing point.

Various embodiments of the invention are discussed below. The amplifier inputs and the amplifier outputs are preferably high-impedance and also separated from one another in a high-impedance manner. This can, for example, be effected in that the amplifier elements are fashioned as voltage-controlled current sources.

When the amplifier elements are fashioned as high-frequency amplifier elements, high-frequency signals can also be transferred way embodiments of inventive crossbar switch.

Row wave resistors are preferably arranged at the ends of the rows opposite the row inputs, and row voltage is applied to the rows via the row wave resistors. It is then possible to supply the row voltage via the row wave resistors to the transistors as base or gate voltage. To prevent direct voltage drops, inductors can be switched in parallel with the row wave resistors.

When the row voltage is between 1.2 and 1.5 volts, the crossbar switch can be operated more stably in the case of a bipolar transistor.

The amplifier elements comprise (parasitic) input capacitances. The amplifier inputs are therefore arranged equidistant along the rows, and the rows are fashioned such that they likewise comprise the row wave resistor, taking into account the input capacitances. Analogous to the principle of cascode amplifiers, with regard to the rows, a line balancing then ensues such that the number of amplifier inputs per row are arbitrarily selected.

A simple realization of the amplifier elements is given when the amplifier elements are fashioned as base bipolar transistors, each with an emitter, a collector and a base, or as base field effect transistors, each with a source, a drain and a gate, when the bases or the gates correspond to the amplifier inputs, when the collectors or the drains are connected with the columns, when column wave resistors are arranged at the ends of the columns opposite the column outputs, and when a column voltage is applied to the columns via the column wave resistors.

Inductors can also be switched in parallel to the column wave resistors to prevent direct voltage drops.

In this embodiment, an energy consumption in the blocked state of the switch elements can be suppressed in a simple manner when the control inputs are connected with the emitters via emitter resistors or with the sources via source resistors.

When switches are arranged between the control inputs and the emitter resistors or the source resistors and the switches can be operated via the interconnection signals such that the emitter resistors or the source resistors are connected with an auxiliary voltage in the deactivated state of the switch and with ground in an activated state of the switches, a conversion of an interconnection voltage into an interconnection current ensues within the switch element. In particular, an activation element arranged outside of the crossbar switch thus does not have to fulfill the function of a current driver.

The switches do not have to transmit the input signals. It is therefore sufficient when the switches are fashioned as low-frequency switches. The auxiliary voltage should be at least one 1 volt higher than the row voltage.

A still-better decoupling of the rows from the columns with regard to not-activated switch elements can be achieved in that auxiliary bipolar transistors, each with an emitter, a collector, and a base, or auxiliary field effect transistors, each with a source, a drain, and a gate, are arranged between the collectors or the drains of the base transistors and the columns, the emitter of the auxiliary bipolar transistors or the sources of the auxiliary field effect transistors are connected with the collectors of the base bipolar transistors or the drains of the base field effect transistors, the collectors of the auxiliary bipolar transistors or the drains of the auxiliary field effect transistors are connected with the columns, and the bases of the auxiliary bipolar transistors or the gates of the auxiliary field effect transistors are connected with an auxiliary voltage.

Such a circuit arrangement is generally known as a "cascode circuit".

A still-better and above all else frequency-independent decoupling of the rows and the columns can be achieved in this embodiment when node points between the base transistors and the auxiliary transistors are connected to ground via filter capacitors.

Analogous to the amplifier elements or the base transistors, the auxiliary transistors (bipolar or field effect) are also preferably fashioned as high-frequency transistors.

The amplifier elements also comprise (parasitic) output capacitances. The amplifier outputs are therefore preferably arranged equidistant along the columns, and the columns are fashioned such that they likewise comprise the column wave resistor, taking into account the output capacitances. A line balancing then also ensues with respect to the columns. With regard to its columns, the crossbar switch is therefore a broadband system whose frequency properties are mainly independent of the number of amplifier outputs connected to the columns.

When coupling capacitors are arranged between the row inputs and the rows as well as between the columns and the column outputs, the row inputs and the column outputs are decoupled from the row or column equilibrium rest potential in terms of direct voltage.

When the crossbar switch is arranged in an integrated circuit, it can be produced particularly cost-effectively and compactly.

DESCRIPTION OF THE DRAWINGS

Further advantages and details result from the subsequently specification of exemplary embodiments in connection with the drawings.

FIG. 1 is a schematic diagram of an embodiment of a crossbar switch;

DETAILED DESCRIPTION OF THE PREFERRED EMBODIMENTS

Figure 3:
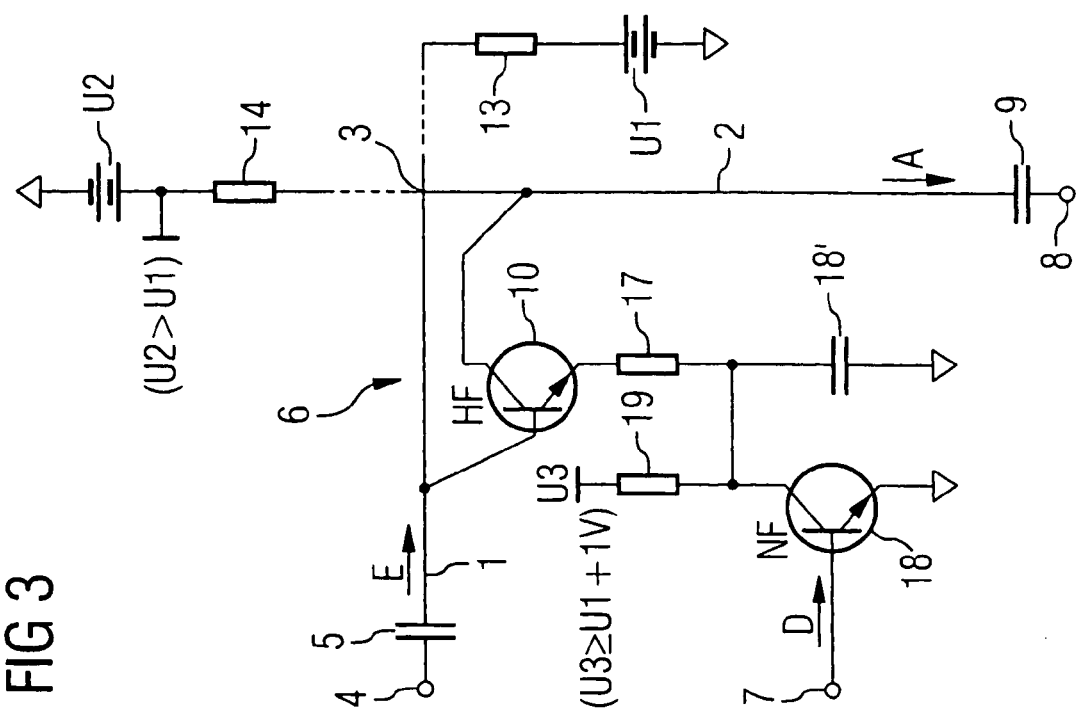
FIG. 3 is a schematic diagram according to an embodiment of a realizable controllable switch element.

According to FIG. 1, a crossbar switch comprises a number of rows 1 and a number of columns 2. The rows 1 and the columns 2 intersect at crossing points 3.

Associated with each row 1 is a row input 4 that is connected with the respective row 1 via an intervening coupling capacitor 5. Input signals E can therefore be input to the rows 1 via the row inputs 4.

Controllable switch elements 6 are arranged at the crossing points 3. Via the switch elements 6, an input signal E that is supplied to a row 1 can be connected through to the column 2 which crosses this row 1 at this crossing point 3. However, the interconnection thereby ensues only when—see FIG. 2—an interconnection signal D is supplied to the respective crossing point 3 via a control input 7. A unique control input 7 is thereby associated with every crossing point 3. Thus every crossing point 3 can be activated independent of all other crossing points 3.

As a rule, an interconnection signal D is supplied at most to a single crossing point 3 per row 1. Likewise, an interconnection signal D is supplied to at most a single crossing point 3 per column 2.

When an interconnection signal D is supplied to a crossing point 3, via a column output 8 an output signal A that corresponds to the interconnected input signal E can be measured at the column 2 defined by the activated crossing point 3. Coupling capacitors 9 are thereby likewise arranged between the column 2 and the column outputs 8. The capacity of the coupling capacitors 9 is preferably equal to the capacity of the coupling capacitors 5.

Figure 2:
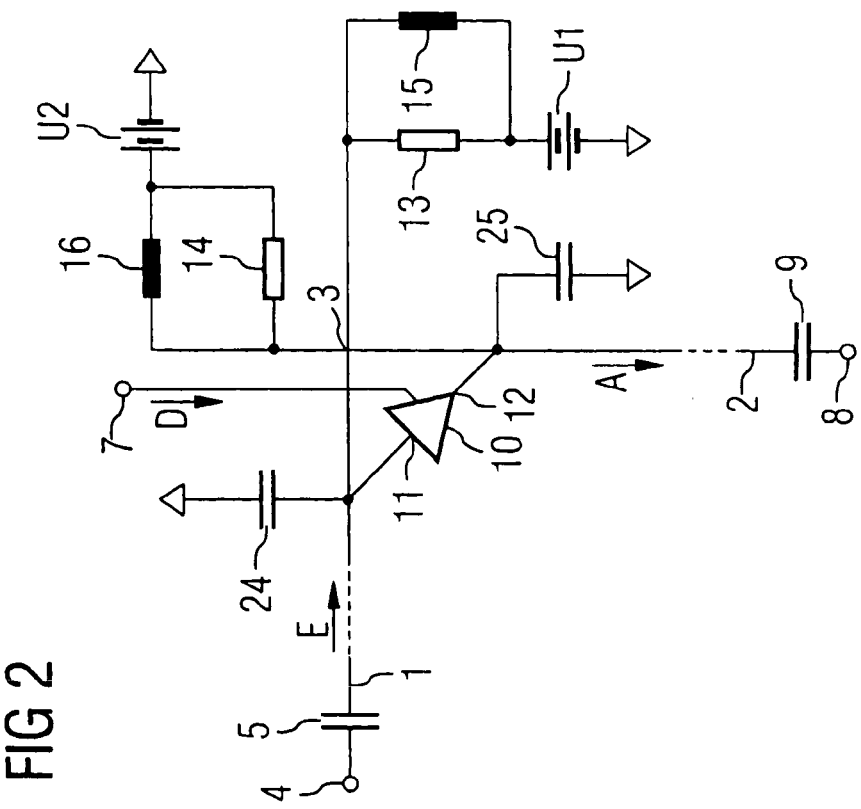
FIG. 2 is a schematic diagram of a crossing point.

According to FIG. 2, the controllable switch elements 6 comprise amplifier elements 10 with an amplifier input 11 and an amplifier output 12. The amplifier inputs 11 are connected with the rows 1, and the amplifier outputs 12 are connected with the columns 2. The amplifier inputs 11 are thereby arranged equidistant along the rows 1. Likewise, the amplifier outputs 12 are thereby arranged equidistant along the columns 2.

FIG. 2 also shows a row voltage U1 applied to the rows 1 via row wave resistors 13. The row wave resistors 13 are thereby arranged at ends of the rows 1 that are opposite the row inputs 4. The row voltage U1 is normally relatively low. It can, for example, be between 1.2 and 1.5 volts, and preferably at approximately 1.3 volts. Furthermore, a column voltage U2 is indicated that is likewise applied to the columns 2 via column wave resistors 14. The column wave resistors 14 are also arranged at ends of the columns 2 that are opposite the column outputs 8. However, the column voltage U2 is normally significantly greater than the row voltage U1. It is, for example, approximately 5 volts. The resistance value of the column wave resistor 14 is preferably the same as that of the row wave resistor 13.

As is also marked in FIG. 2, inductors 15, 16 can also be switched in parallel with the wave resistors 13, 14 to prevent a DC voltage drop. However, this is not absolutely necessary.

FIG. 3 shows an embodiment of a controllable switch element 6. According to FIG. 3, the amplifier element 10 is fashioned as a bipolar transistor 10. As indicated by the addition "HF" in FIG. 3, the bipolar transistor 10 is fashioned as a high-frequency amplifier element 10. The bipolar transistor 10, as is known, comprises an emitter, a collector and a base. According to FIG. 3, the base is connected with the row 1 that crosses a column 2 at this crossing point 3. The base thus corresponds to the amplifier input 11. The collector is connected with the column 2 that crosses a row 1 at this crossing point 3. In the embodiment of FIG. 3, the collector thus corresponds to the amplifier output 12.

According to FIG. 3, the control input 7 of the shown switch element 6 is connected with the emitter of the transistor 10 via an emitter resistor 17. According to FIG. 3, a switch 18 (that, in the present case, is fashioned as a switch transistor in the emitter circuit) is arranged between the control input 7 and the emitter resistor 17. This transistor 18 can be fashioned as a low-frequency switch 18 since it does not have to conduct the input signal E or the output signal A. This is indicated by the addition "NF" in FIG. 3.

When no interconnection signal D is supplied via the associated control input 7 to the crossing point 3 shown in FIG. 3, the switch transistor 18 locks. An auxiliary voltage U3 thereby forms via a multiplier resistor 19 at a coupling capacitor 18' switched in parallel. The capacitance of the coupling capacitor 18' also preferably corresponds with that of the coupler capacitor 5. The auxiliary voltage U3 is at least 1 volt higher than the row voltage U1. It can be identical with the column voltage U2.

The emitter of the high-frequency transistor 10 is thus connected with the auxiliary voltage U3 via the multiplier 19 and the emitter resistor 17. The operating point of the high-frequency transistor 10 is thereby located in the lock region. The appertaining column 2 is therefore separated in terms of a signal from the intersecting row 1. Also, in this state, no current flows through the transistor 10, such that it also requires no electrical energy.

However, when the interconnection signal D is supplied to the crossing point 3 via the control input 7, the switching transistor 17 is conducting. The voltage applying on the coupling capacitor 18' therefore sinks to ground potential. The emitter resistor 17 is thus connected with ground in the activated state of the switch 18. The working point of the high-frequency transistor 10 is thereby shifted to the transmission region such that a (low) current can flow over the base-emitter path of the high-frequency transistor 10. Based on the amplifier properties of the high-frequency transistor 10 operated in the emitter arrangement, the current flowing via the collector of the high-frequency transistor 10 is thereby modulated with the base current, which in turn (due to the column wave resistor 14) effects a voltage modulation on the connection column 2. Only in this state does the transistor 10 require electrical energy.

The emitter resistor 17 thereby has the effect that a high input resistance and a defined voltage amplification result. This is also the reason for the amount of the row voltage U1 of approximately 1.3 volts. The lowest thermal amplification drift results at this voltage value.

The amplifier element 10 according to FIG. 3 thus acts as a voltage-controlled current source 10. Due to the embodiment according to FIG. 3, the amplifier input 11 and the amplifier output 12 are also high-resistance. They are also separated from one another in a high-impedance fashion. As already mentioned, via the shifting of the operating point of the high-frequency transistor 10 in the lock region, it is furthermore achieved that the amplifier element 10 only requires electrical energy when the interconnection signal D is supplied to its crossing point 3.

Figure 4:
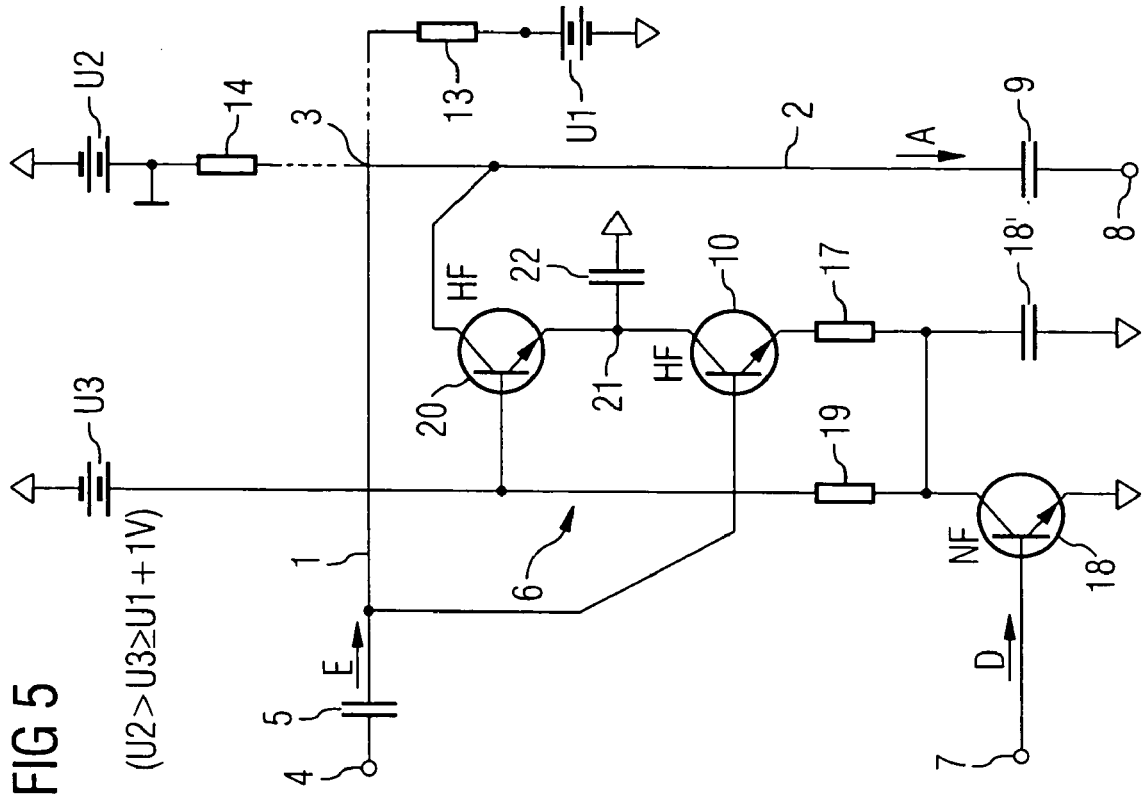
FIG. 4 is a schematic diagram according to an additional embodiment of a realizable controllable switch element.

The embodiment of the controllable switch element 6 according to FIG. 4 primarily corresponds to the embodiment of FIG. 3. In contrast to the embodiment of FIG. 3, however, the transistors 10, 18 of FIG. 4 are not fashioned as bipolar transistors, but rather as field effect transistors. The other portions of the design, and particularly the functionality of the controllable switch element 6 according to FIG. 4, is however completely analogous to that of FIG. 3.

Figure 5:
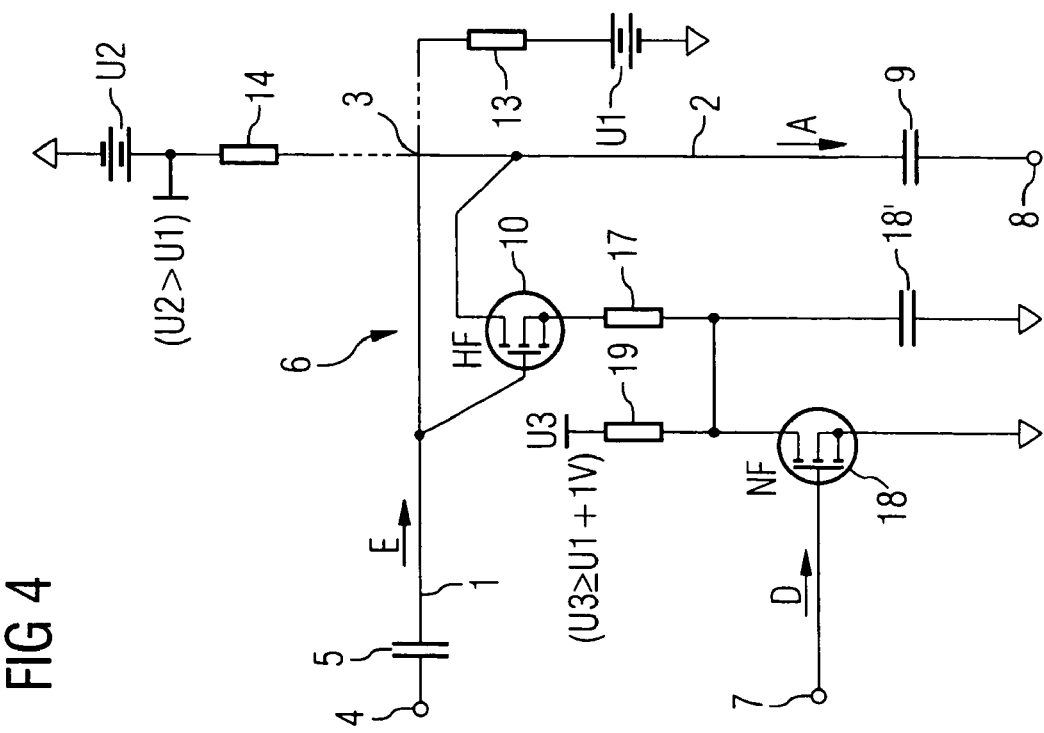
FIG. 5 is a schematic diagram according to a further embodiment of a realizable controllable switch element.

FIG. 5 shows an addition to the circuit of FIG. 3. In this embodiment, in addition to the high-frequency transistor 10 and to the switch transistor 18, a further transistor 20 is present, subsequently designated as an auxiliary transistor 20. As indicated by the supplement "HF", this transistor 20 is also fashioned as a high-frequency transistor 20. It is also fashioned as a bipolar transistor 20, and, as can be seen in FIG. 5, is arranged between the collector of the transistor 10 and the column 2. Like every bipolar transistor, it also comprises an emitter, a collector and a base. The emitter of the auxiliary transistor 20 is connected with the collector of the transistor 10; the collector of the auxiliary transistor 20 is connected with the column 2. Its base is connected with the auxiliary voltage U3.

In the embodiment according to FIG. 5, the auxiliary voltage U3 is smaller than the column voltage U2. It is normally approximately half as large as the column voltage U2.

Both of the high-frequency transistors 10, 20 thus form what is known as a cascode circuit. A significantly better separation of the rows 1 from the columns 2 via the deactivated switch elements 6 already ensues via this cascode circuit. In addition to the design as a cascode circuit, a node point 21 between the two high-frequency transistors 10, 20 is connected with ground via a blocking capacitor 22. The HF transistors 10, 20 and the blocking capacitor 22 thus form a highly effective series-short-series switch.

At an upper limit frequency of, for example, 200 MHz, a lock damping of approximately 36 dB yields a collector closed current through the transistor 10, 20 of, for example, 50 mA and a collector base capacity of 0.5 pF for the pure cascode circuit. Given insertion of the blocking capacitor 22 with a capacity of, for example, 50 pF, however, a lock damping results of approximately 40+30=70 dB. Thus, in the locked state, a significantly better decoupling results that moreover—at least partially—also remains constant at high frequencies. However, the amplification in the interconnected state is only impaired in negligible scope by the blocking capacitor 22.

Figure 6:
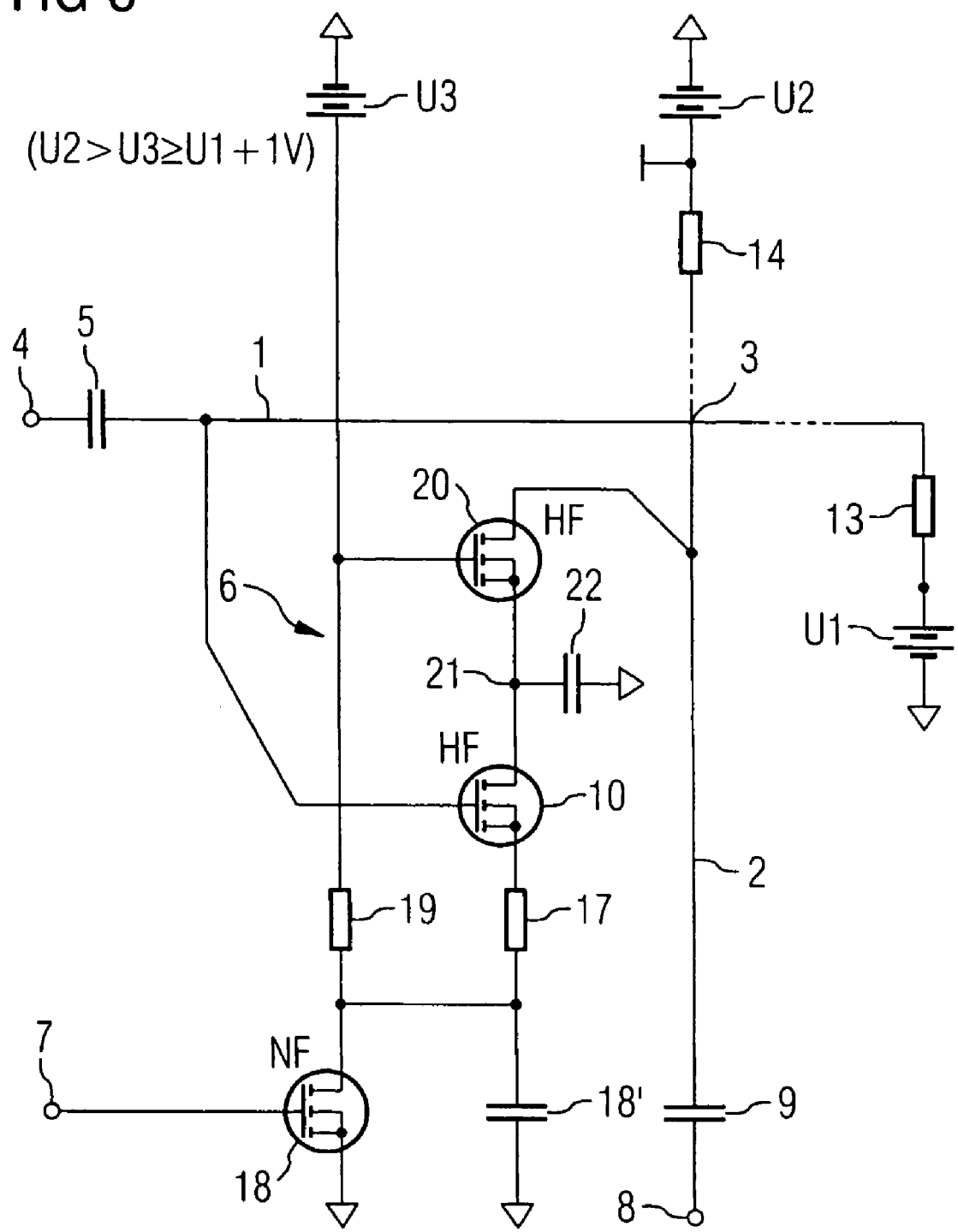
FIG. 6 is a schematic diagram according to yet a further embodiment of a realizable controllable switch element.

The embodiment according to FIG. 6 significantly corresponds to the embodiment of FIG. 5. As with FIGS. 3 and 4, the significant difference is that the transistors 10, 18, 20 in the embodiment according to FIG. 6 are not fashioned as bipolar transistors but rather as field effect transistors. However, the other portions of the design, and above all the function of the embodiment according to FIG. 6, are analogous to those of FIG. 5.

In the preceding, embodiments were specified in connection with FIGS. 3 through 6 in which either bipolar transistors 10, 18, 20 were used exclusively or field effect transistors 10, 18, 20 were used exclusively. Such embodiments are preferable, since in this case the transistors 10, 18, 20 can be more easily tuned to one another. As is indicated by a framing 23 in FIG. 1, an arrangement of the crossbar switch in an integrated circuit is also possible in a relatively simple manner. The crossbar switch can in this case thus be arranged on a single substrate. However, in principle, other hybrids are also possible, such as the use both of bipolar and field effect transistors 10, 18, 20. For example, it is possible to fashion the HF transistor(s) 10, 20 as bipolar transistors, and yet to fashion the switch transistor 18 as a field effect transistor.

The transistors 10, 18, 20—independent of the design as bipolar or field effect transistors 10, 18, 20—are also preferably fashioned as npn-transistors. This is, however, also not necessary. In principle, a use of pnp-transistors 10, 18, 20 would also be possible.

The amplifier inputs 11 comprise parasitic input capacitances. This is indicated by the capacitances 24 in FIG. 2. The lines 1 are therefore fashioned such that they likewise comprise the row wave resistor 13, taking into account the input capacitances 24. This results in "line balancing", as it is generally known from distributed amplifiers.

The amplifier outputs 12 likewise comprise parasitic input capacitances. This is also indicated by capacitances 25 in FIG. 2. The columns 2 are therefore fashioned such that they likewise comprise the column wave resistor 14, taking into account the output capacitances 25. A line balancing also thus results here.

The inventive design of a crossbar switch enables a distribution of nearly arbitrarily many high-frequency input signals E to nearly arbitrarily many outputs 8. An upper limit only results due to the ultimate damping of the rows 1 and the columns 2 as well as due to the ultimate real part of the input and output electrical conductance of the switch elements 6.

Based on the embodiments stated above, it is clear that one of ordinary skill in the art can also use realizations different than those shown in FIGS. 3 through 6. For example, instead of the switch transistor 18, it is possible to arrange one high-frequency switch (bipolar or field effect) between the lines 1 and the amplifier inputs 11 as well as between the amplifier outputs 12 and the columns 2. It is also possible to use only one additional high-frequency switch that is arranged only between the respective line 1 and the respective amplifier input 11. In this case, however, it must be ensured via corresponding wiring of the amplifier element 10 that a current only flows through the amplifier element 10 (and therewith energy is only required) when the interconnection signal D is supplied to the respective crossing point 3. When only a low current is required to interconnect the high-frequency transistor 10, the switch transistor 18 can also be omitted. In this case, for example, a direct activation of the amplifier element 10 via a CMOS gate could ensue.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware components configured to perform the specified functions. Furthermore, the present invention could employ any number of conventional techniques for electronics configuration, signal processing and/or control and the like.

The particular implementations shown and described herein are illustrative examples of the invention and are not intended to otherwise limit the scope of the invention in any way. For the sake of brevity, conventional electronics, control systems, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

REFERENCE LIST

| | |
|---|---|
| 1 | rows |
| 2 | columns |
| 3 | crossing points |
| 4 | row inputs |
| 5, 9, 10' | coupling capacitors |
| 6 | switch elements |
| 7 | control inputs |
| 8 | column outputs |
| 10 | amplifier elements |
| 11 | amplifier inputs |
| 12 | amplifier outputs |
| 13, 14 | wave resistors |
| 15, 16 | inductors |
| 17, 19 | resistors |
| 18 | switch |
| 20 | auxiliary transistors |
| 21 | node points |
| 22 | block capacitors |
| 23 | framing |
| 24, 25 | capacitances |
| A | output signals |
| D | interconnection signals |
| E | input signals |
| U1, U2, U3 | voltages |

What is claimed is:

1. A crossbar switch, comprising:

a number of rows and a number of columns crossing the rows at crossing points;

a row input at each row configured to receive an input signal supplied to each row;

controllable switch elements arranged at the crossing points via which an input signal supplied to a row is switched to a column crossing this row at this crossing point when a switching signal is supplied to the respective crossing point;

a column output to which a switched input signal is delivered as an output signal at each column;

amplifier elements of the controllable switch elements that comprise an amplifier input and an amplifier output, wherein the amplifier inputs are connected with the rows and the amplifier outputs are connected with the columns and are arranged equidistant along the rows, the amplifier elements comprising input capacitances and are wired such that they only consume electrical energy when the switching signal is supplied to the respective crossing point; and row wave resistors that are arranged at ends of the rows opposite the row inputs, a row voltage being applied to the rows via the row wave resistors;

wherein:

row conductors are fashioned such that they likewise have the resistance value of the row wave resistor, taking into account the input capacitances.

2. The crossbar switch according to claim 1, wherein the amplifier inputs and the amplifier outputs are high-impedance and are separated from one another in a high-impedance manner.

3. The crossbar switch according to claim 1, wherein the amplifier elements are fashioned as voltage-controlled current sources.

4. The crossbar switch according to claim 1, wherein the amplifier elements are fashioned as high-frequency amplifier elements.

5. The crossbar switch according to claim 1, further comprising:

coupling capacitors that are arranged between the row inputs and the rows as well as between the columns and the column outputs.

6. The crossbar switch according to claim 1, further comprising:

inductors that are switched in parallel with the row wave resistors.

7. The crossbar switch according to claim 1, wherein the crossbar switch is arranged in an integrated circuit.

8. The crossbar switch according to claim 1, wherein the row voltage is between 1.2 and 1.5 volts.

9. The crossbar switch according to claim 1, wherein:

the amplifier elements are fashioned as base bipolar transistors, each with an emitter, a collector and a base, or as base field effect transistors, each with a source, a drain and a gate;

the bases or the gates correspond to the amplifier inputs;

the collectors or the drains are connected with the columns;

column wave resistors are arranged at the ends of the columns opposite the column outputs via which a column voltage is applied to the columns.

10. The crossbar switch according to claim 9, further comprising:

inductors that are switched in parallel with the column wave resistors.

11. The crossbar switch according to claim 9, wherein control inputs are connected with the emitters via emitter resistors or with the sources via source resistors.

12. The crossbar switch according to claim 11, further comprising:

switches that are arranged between the control inputs and the emitter resistors or the source resistors, the switches being operable via the switching signals, such that the emitter resistors or the source resistors are connected with an auxiliary voltage in the deactivated state of the switches and with ground in an activated state of the switches.

13. The crossbar switch according to claim 12, further comprising:

row wave resistors that are arranged at ends of the rows opposite the row inputs, a row voltage being applied to the rows via the row wave resistors wherein the auxiliary voltage is at least 1 volt higher than the row voltage.

14. The crossbar switch according to claim 1, wherein an auxiliary voltage is at least 1 volt higher than the row voltage.

15. The crossbar switch according to claim 12, wherein the switch is fashioned as a low-frequency switch.

16. The crossbar switch according to claim 9, further comprising:

auxiliary bipolar transistors, each with an emitter, a collector and a base, or auxiliary field effect transistors, each with a source, a drain and a gate, that are arranged between the collectors or the drains of the base transistors and the columns, wherein:

the emitter of the auxiliary bipolar transistors or the sources of the auxiliary field effect transistors are connected with the collectors of the base bipolar transistors or the drains of the base field effect transistors;

the collectors of the auxiliary bipolar transistors or the drains of the auxiliary field effect transistors are connected with the columns; and the bases of the auxiliary bipolar transistors or the gates of the auxiliary field effect transistors are connected with an auxiliary voltage.

17. The crossbar switch according to claim 16, further comprising:

blocking capacitors via which node points between the base transistors and the auxiliary transistors are connected with ground.

18. The crossbar switch according to claim 16, wherein the auxiliary transistors are fashioned as high-frequency transistors.

19. The crossbar switch according to claim 16, wherein the auxiliary voltage is smaller than the column voltage.

20. The crossbar switch according to claim 9, wherein:

the amplifier elements comprise output capacitances;

the amplifier outputs are arranged equidistant along the columns; and the columns are fashioned such that they likewise have the resistance of the column wave resistor, taking into account the output capacitances.

21. The crossbar switch according to claim 6, wherein the inductors are arranged parallel to said row wave resistors.

22. The crossbar switch according to claim 10, wherein the inductors are arranged parallel to said column wave resistors.

* * * * *